United States Patent
Diekhans et al.

(10) Patent No.: US 8,332,135 B2
(45) Date of Patent: Dec. 11, 2012

(54) METHOD FOR GENERATING REFERENCE DRIVING TRACKS FOR AGRICULTURAL WORKING MACHINES

(75) Inventors: Norbert Diekhans, Guetersloh (DE); Lars Meyer Zu Helligen, Spenge (DE); Gerhard Nienaber, Oelde (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 420 days.

(21) Appl. No.: 12/627,321

(22) Filed: Nov. 30, 2009

(65) Prior Publication Data

US 2010/0217516 A1    Aug. 26, 2010

(30) Foreign Application Priority Data

Feb. 20, 2009 (DE) .................. 10 2009 009 818

(51) Int. Cl.
*A01B 69/00* (2006.01)
*G01C 21/00* (2006.01)
*G05D 1/02* (2006.01)

(52) U.S. Cl. ........ 701/400; 701/41; 701/50; 340/995.19

(58) Field of Classification Search .................. 701/401, 701/50, 41, 416, 466, 412; 340/992, 995.19
See application file for complete search history.

(56) References Cited

U.S. PATENT DOCUMENTS

| | | | |
|---|---|---|---|
| 6,205,381 B1 * | 3/2001 | Motz et al. ...................... 701/25 |
| 6,490,539 B1 * | 12/2002 | Dickson et al. ............... 702/150 |
| 2003/0187560 A1 * | 10/2003 | Keller et al. .................... 701/50 |
| 2007/0168116 A1 | 7/2007 | Meyer Zu Helligen et al. |
| 2007/0233374 A1 * | 10/2007 | Diekhans et al. ............. 701/209 |

FOREIGN PATENT DOCUMENTS

DE    10 2006 002 567    8/2007

* cited by examiner

*Primary Examiner* — Tan Q Nguyen
(74) *Attorney, Agent, or Firm* — Michael J. Striker

(57) ABSTRACT

Generation of one or more reference driving tracks for use in automatic route planning of an agricultural working vehicle includes driving along a starting route of an agricultural field to be worked, recording the starting route in a data processing device, selecting at least one section of the recorded starting route as a reference driving track, investigating the starting route along its entire length for changes in direction, and in the selecting at least one section, selecting a section as the reference driving track only if a change in direction that falls below a limit value is not found anywhere along an entire length of the section.

16 Claims, 4 Drawing Sheets

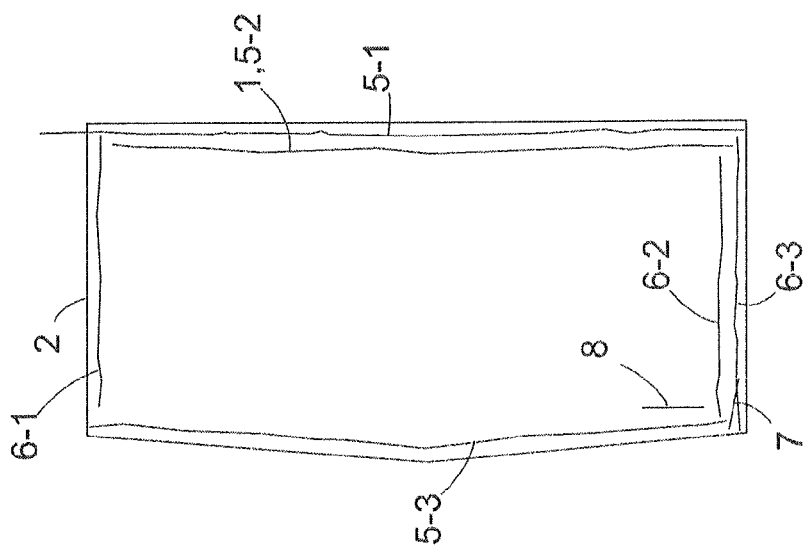
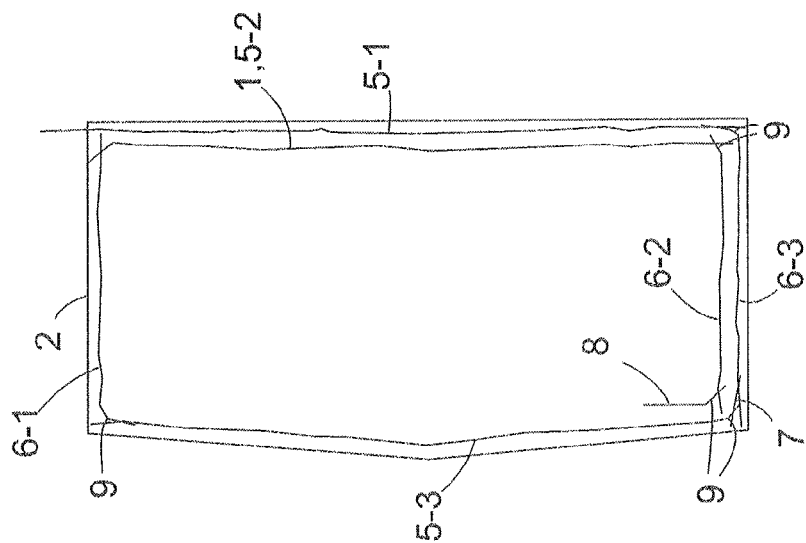
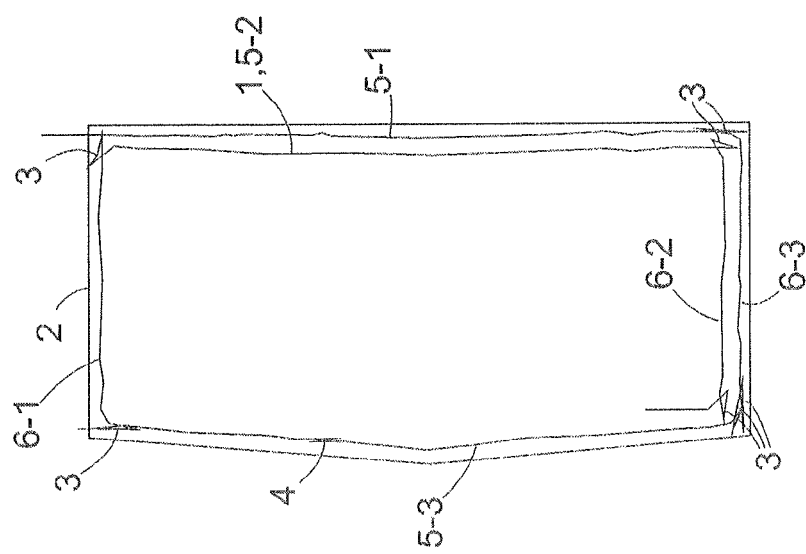

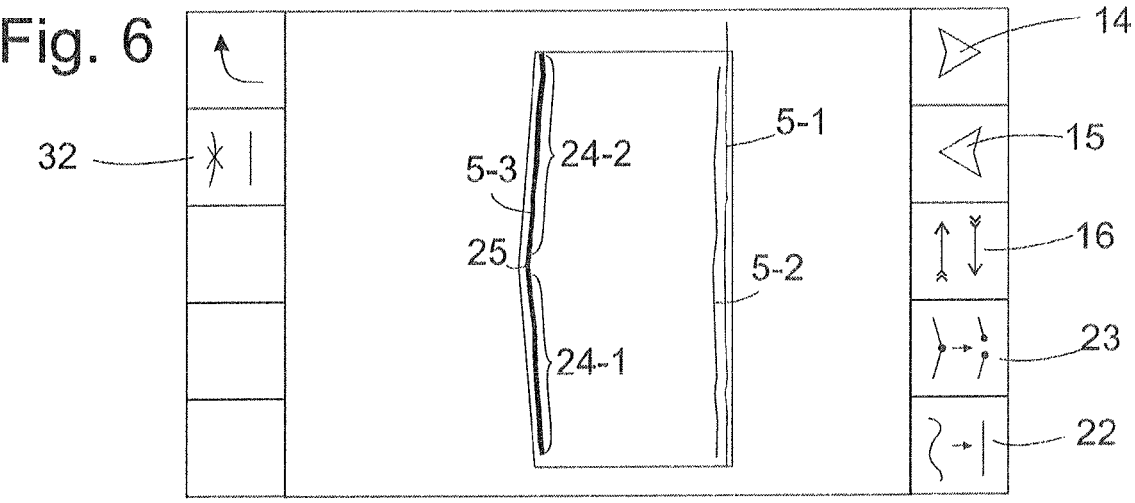
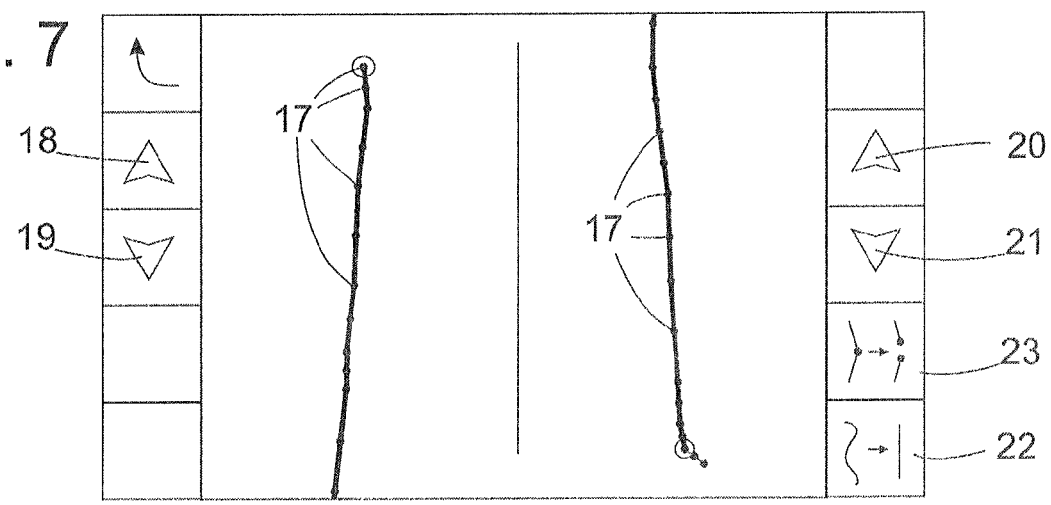
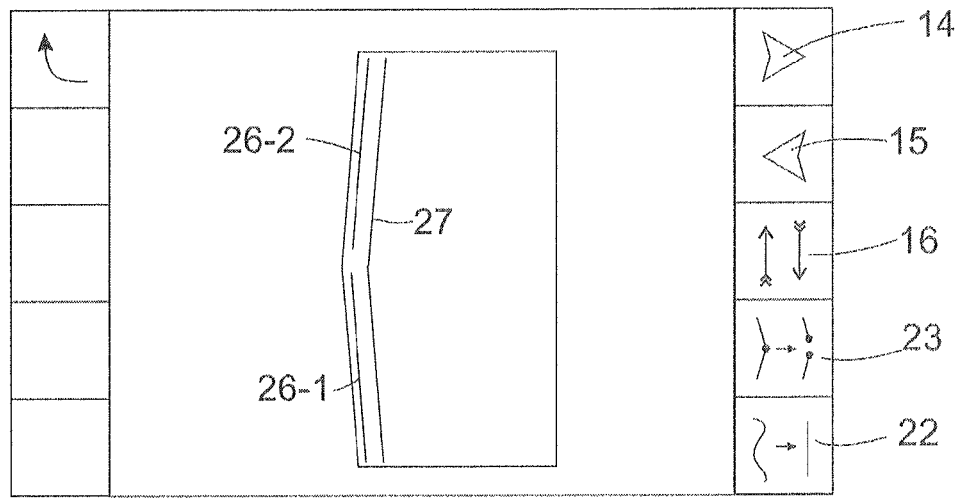

METHOD FOR GENERATING REFERENCE DRIVING TRACKS FOR AGRICULTURAL WORKING MACHINES

CROSS-REFERENCE TO A RELATED APPLICATION

The invention described and claimed hereinbelow is also described in German Patent Application DE 10 2009 009 818.6 filed on Feb. 20, 2009. This German Patent Application, whose subject matter is incorporated here by reference, provides the basis for a claim of priority of invention under 35 U.S.C. 119(a)-(d).

BACKGROUND OF THE INVENTION

The present invention relates to a method for generating at least one driving track for the automatic route planning of an agricultural vehicle.

Automatic route planning systems and methods are being used to an increasing extent in agriculture in order to work territory in a more efficient manner, be it by determining the shortest and fastest route possible for working an agricultural field, or to predict operating parameters of vehicles such as tank fill levels and locations of the vehicles at various times during operation, and to optimize the effectiveness of the vehicles' interaction with one another.

A method is known from DE 10 2006 002 567 A1. In this method, an agricultural field to be worked is driven along by a vehicle, and the route that is covered is recorded. The recorded route is displayed on a screen, and an operator is given the option of selecting start points and end points of a reference driving track on the route that was traveled. The reference driving track may then be used to automatically determine the arrangement of other driving tracks to be driven as the working of the field continues. This relieves the driver of the vehicle of the task of having to determine an efficient route to take in order to work the field, and it opens up the possibility of at least partially automating the working of the field, since the vehicle is guided along the planned route via an automatic steering system.

As an alternative to selecting start points and end points of the reference driving track in a graphical display, the known method gives the driver of the vehicle the option of specifying the start point and end point of a reference driving track; in this case, the operator enters a start signal in the route planning system when he begins to drive a reference driving track, and he enters a stop signal in the route planning system once he has finished following a reference driving track.

Neither of these approaches is entirely satisfactory. If the route traveled so far is displayed in entirety on a touchscreen monitor, it is difficult to determine the start and end points of a reference driving track with the necessary degree of accuracy, especially when the field to be worked is large. Although it would be feasible to depict certain parts of the route in a larger scale, it is difficult to determine a start or end point of a reference driving track in a reasonable manner if the two points cannot be seen at the same time. In particular, when the route that was traveled is composed of several parallel sections that can be seen at the same time in an enlarged view, the process of selecting start and end points of the reference driving track is highly prone to error. If the driver wants to determine start and end points of the reference driving track while he is driving along it, the likelihood is great that he will forget to generate the start or stop signal at the right time, especially if he is devoting his full attention to steering the vehicle as exactly as possible along the intended course of the reference driving track.

SUMMARY OF THE INVENTION

The object of the present invention, therefore, is to create a method for generating a reference driving track that fully relieves the operator of the task of selecting a reference driving track from a starting route he has driven, or to at least support him in this task.

This object is attained as follows, using a method for generating a reference driving track for use in automatic route planning for an agricultural working vehicle comprising the steps:
a) Drive along a starting route on an agricultural field to be worked;
b) Record the starting route in a data processing device;
c) Select at least one section of the recorded starting route as a reference driving track the starting route is investigated along its entire length for changes in direction, and, in step c), a section is selected as the reference driving track only if a change in direction that falls below a limit value is not found anywhere along the entire length of the section. In this manner, parts of the starting route that include, e.g., turning maneuvers between two driving tracks that extend in parallel to one another, curves driven at corners of the agricultural field, manuevers for driving around obstacles, or the like are excluded from the selection as the reference driving track.

Advantageously, the selection of a single reference driving track from among the sections obtained in this manner may likewise be carried out by the data processing device; for this purpose, the quality, in particular, of the sections may be evaluated based on at least one criterium, and the section having the highest quality may be selected as the reference driving track. The driver is therefore unaware that the reference driving track is being generated, and is therefore able to devote his attention to other tasks.

As an alternative, the action performed by the data processing device may be limited to preselecting one or more reference driving tracks and offering these preselected reference driving tracks to an operator for him to make his final section. If only one reference driving track is selected, the option that is presented for selection is merely presented for confirmation. The decision as to whether a preselected reference driving track is actually used is up to the operator, independently of the number of preselected reference driving tracks. The same criteria may be used for the preselection that are used for the aforementioned quality assessment.

The preselected reference driving tracks may be displayed to the operator in a screen in order to make it easier for him to make his final selection.

Preferably, the operator is also given the option of shortening or lengthening a preselected reference driving track if he finds the length of a reference driving track specified by the data processing device to be unsuitable.

Along a sufficiently straight section of the starting route, it is always possible to identify overlapping sections that contain no changes in direction that exceed the limit value along their entire length. In order to keep the number of reference driving tracks within limits, the longest of these sections should be selected for use as the reference driving track. This does not mean that the data processing device would not have to identify the shorter sections individually at all. It is feasible, for example, for the data processing device to cut out all of those pieces from the recorded starting driving track, the change in direction of which exceeds the limit value, and for the reference driving tracks to be preselected from among the remaining sections.

A quality criterium that may be used to reduce the number of possible reference driving tracks is the speed of the working machine as it follows the starting route. If this speed is recorded, it is possible, e.g., in step c), to select only those sections of the starting route as the reference driving track on which a minimum speed was not fallen below. Route sections that are difficult to travel and require a lower speed are therefore automatically excluded from the selection as a reference driving track, since it is likely that, if a section of this type is used as the reference driving track, a route that is planned based on the reference driving track will likewise contain sections that are difficult to travel and therefore must also be driven along slowly.

A further quality criterium is the magnitude of directional changes that occur on a section of the route. For example, the number of preselected reference driving tracks may be reduced as follows: in step c), out of several sections that contain no changes in direction that exceed the limit value anywhere along their entire length, one or more that include (s) the greatest change in direction is/are discarded.

A further quality criterium that may be considered is the conformance of the direction of a route section with a preferred direction. For example, a preferred direction may be determined from among several sections that contain no changes in direction that exceed the limit value along their entire length, and one or more sections, the direction of which deviates the most from the preferred direction, are excluded from the selection as the reference driving track. If the starting route already contains several driving tracks that extend in parallel next to one another, it is highly likely that one of these will be selected as the reference driving track. Furthermore, if the starting route includes a path taken by the vehicle around the field to be worked, it is more likely that a section of this path that extends along a longitudinal edge of the field will be selected as the reference driving track than will a section along a transverse edge.

The length may also be used as a quality criterium. For example, out of several sections of the starting route that contain no directional changes that exceed the limit value along their entire length, every section having a length that falls below a specified minimum length may be discarded. This minimum length may be fixedly specified, or it may be proportional to the longest section, so that the dimensions of the field to be worked are automatically taken into account.

The starting route may include sections that are traveled along in the reverse direction, e.g., if the vehicle is stopped in front of an obstacle and is backed up, so that the driver may remove the obstacle and continue onward. Since it is undesirable to include sections of this type in a reference driving track, it is advantageous to exclude sections of this type that are driven along in the reverse direction from the recorded starting route.

To suppress any influences such as the wobbling back and forth of the vehicle on uneven ground in the determination of the reference driving track, it may be advantageous to smooth a section selected in step c). Since the driver usually knows whether deviations from the straight line are due to accidental influences or to intended steering, it is advantageous for the smoothing step to be initiated by the driver.

Preferably, the method according to the present invention may be used in real time while an agricultural field is being worked in order to obtain a reference driving track that is used to plan a route on the part of the field that is not covered by the starting route, provided that the starting route already traveled covers only a portion of the agricultural field to be worked.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a starting route on a field that is followed by an agricultural vehicle, and on which the method according to the present invention is based;

FIG. 2 shows a first stage in the processing of the starting route of the method according to the present invention;

FIG. 3 shows a second processing stage of the method according to the present invention;

FIG. 6 shows a depiction of a display screen in the vehicle, using which an operator may select a reference driving track from among automatically extracted route sections according to the present invention;

FIG. 7 shows a display image that allows an operator to edit a selected route section according to the present invention;

FIG. 8 shows a depiction of the display screen in the vehicle, in which a planned driving track, which was determined based on selected reference driving tracks, is shown according to the present invention;

DESCRIPTION OF THE PREFERRED EMBODIMENTS

Figure 5:
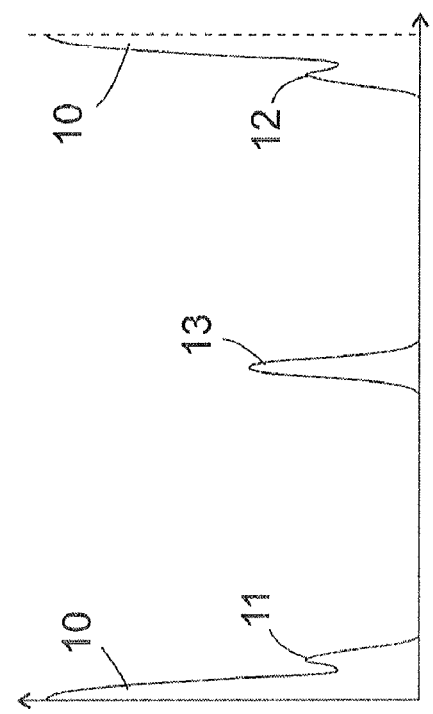
FIG. 5 shows the distribution of directions of the route sections extracted in the processing stage depicted in FIG. 4 according to the present invention.

The method according to the present invention may be used in any agricultural vehicle in order to work an agricultural field, such as a tractor, a forage harvester, a combine harvester, or the like, which is equipped with an automatic position determination system, e.g., a GPS receiver. The GPS receiver determines the position of the vehicle at regular intervals and transmits it to a computer. The computer is preferably a fieldwork computer in the vehicle, although the method may also be implemented using a stationary computer to which the location information from the GPS receiver is continually transmitted, preferably in a wireless manner.

The computer reconstructs the route traveled by the vehicle based on location information obtained in chronological sequence. Starting route 1 followed by the vehicle is shown in FIG. 1 along with the outline of a field 2 to be worked by the vehicle, merely to enhance clarity. The computer requires a priori no information about the shape of the field to be worked by the vehicle.

As shown in FIG. 1, the vehicle is first driven once along the edge of field 2 in order to reveal turnaround areas.

Even if the edges of field 2 are straight lines, it is typically not possible to travel along an exactly straight route that is parallel to the adjacent edge, since, even if the driver is experienced, the vehicle must approach the edge or travel away from it slightly before the driver is able to recognize that the distance between the vehicle and the field edge should be corrected, and then turn the vehicle accordingly. Likewise, if the vehicle sways from side to side due to uneven ground, then the recorded route followed by the vehicle may not form an exactly straight line, since a reference point of the vehicle, based on which the vehicle position is determined, may be deflected to one side if the vehicle sways, even while it is traveling straight ahead.

There are sections of starting route 1 in which the vehicle travels in the reverse direction, e.g., sections 3 at the field corners, which result from the vehicle first being driven deep into a corner, in order to work the entire field surface, and then being backed up in order to proceed around the curve. Even when the vehicle travels along the field edges, however, it is possible for sections 4 to occur along which the vehicle traveled in the reverse direction, e.g., if the driver hit an obstacle while working the field and had to back up in order to remove it, to protect the working units on the vehicle. It is assumed that sections that were traversed in the reverse direction may basically never be considered for use as reference driving tracks. Therefore, they may be deleted from recorded starting route 1. As shown in FIG. 2, starting route 1 may therefore be broken down into a large number of separate sections 5-1, 5-2, 5-3, 6-1, 6-2, 6-3, each of which extends along an edge of field 2, from one corner to the other, and possibly into shorter fragments 7, 8 at the corners.

In the case of section 4, in which the path followed by the vehicle is substantially the same immediately before and after the vehicle is backed up, the path sections that are formed before and after the vehicle is backed up are handled as one cohesive section 5-3 after section 4 is deleted.

The change in direction is calculated for the remaining sections of starting route 1 along the entire length, and it is compared to a limit value. Sections 9, in which the change in direction exceeds the limit value, as is the case, in particular, for abruptly curved ends of sections 5-1, 5-2, 5-3, 6-1, 6-2, 6-3, 7, 8 shown in FIG. 2, are likely not considered for use as reference driving tracks. Sections which have been shortened by these abruptly curved ends, 5-1, 5-2, 5-3, 6-1, 6-2, 6-3, 7, 8, are shown in FIG. 3.

Figure 4:
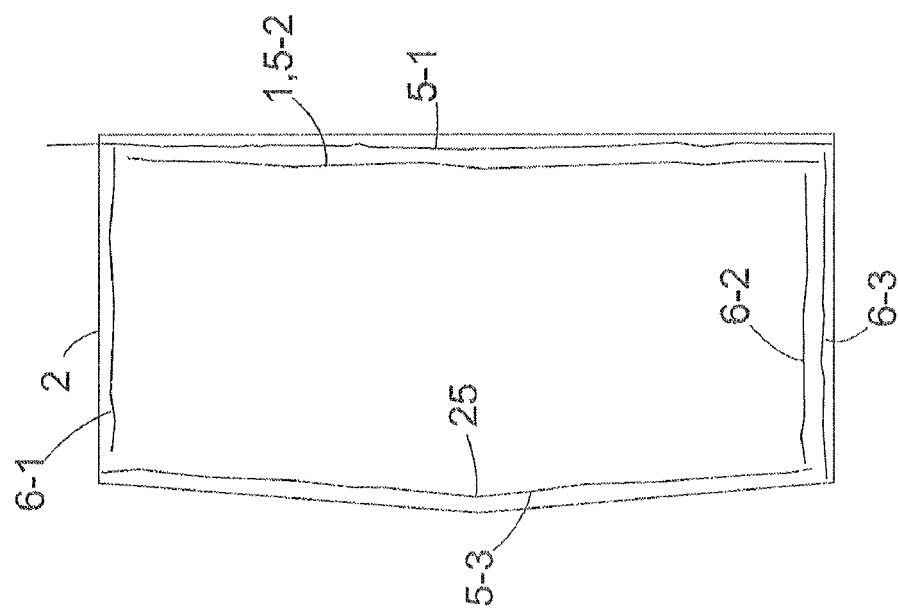
FIG. 4 shows a third processing stage of the method according to the present invention.

The computer calculates the length of remaining route sections 5-1, 5-2, 5-3, 6-1, 6-2, 6-3, 7, 8 and compares them to a limit value. The limit value may be fixedly specified, or it may be dependent on the dimensions of field 2. In particular, a specified portion of the length of the longest of sections 5-1, . . . 6-3, 7, 8 may be used as the limit value. The length of fragments 7, 8 is below the limit value, and so only section 5-1, . . . 6-3 remain as potential reference tracks, in FIG. 4.

In a subsequent step, the preferred direction of these remaining sections is determined. FIG. 5 shows, in a qualitative depiction, a graph of the distribution of direction of the type that could be obtained for the route sections shown in FIG. 4. A maximum 10 at 0° and 180° results from sections 5-1, 5-2 which extend along the straight edge of the field on the right-hand side. Two smaller local maxima 11, 12 correspond to section 5-3 which extends along the left-hand edge of the field and is likewise bent slightly. A further maximum 13 at 90° results from sections 6-1, . . . 6-3 which extend along the narrow sides of field 2. The computer identifies the greatest maximum at 0° as the preferred direction of field 2. Therefore, only sections 5-1, 5-3, which extend in the longitudinal direction, are considered for use as reference driving tracks.

They are offered to an operator of the computer, i.e., preferably the driver of the vehicle, for selection and editing. For this purpose, the vehicle includes a touch-sensitive display, or "touchscreen", in which, as shown in FIG. 6, route sections 5-1, 5-2, 5-3 which may be considered for use as reference driving tracks are displayed in one main field in the form of a map. As described above, data on the shape of field 2 are not required for the method; if they are available, however, it is possible for the outline of field 2 to be displayed on the screen together with route sections 5-1, 5-2, 5-3 that were preselected by the computer.

The operator may make a section from among displayed route sections 5-1, . . . 5-3 by using his finger to touch the image of the particular section on the screen, or by touching selection symbols 14, 15 displayed in the screen next to the main field; selection symbols 14, 15 activate the route sections shown, one after the other. A route section which has been activated by the operator, e.g., section 5-3 in this case, is emphasized in the display, e.g., by being displayed in bold.

As a further tool for use to select a route section from among displayed sections 5-1, . . . , 5-3, a key 32 may be made available to the driver, using which he may instruct the computer to select the section having the greatest directional change, and to exclude it from further processing. Of the sections shown in FIG. 6, section 5-3 has the greatest change in direction, and, if this change in direction were due to inaccurate driving, it would be advantageous to exclude section 5-3 from being offered for selection as the reference driving track. In the case assumed here, however, the change in direction of section 5-3 is due to the field edge not being straight, and, knowing this, the driver will not use key 32.

Once a route section has been activated, the operator may select the activated route section—by touching a selection symbol 16—as a reference driving track, and to simultaneously switch to an editing mode, a typical example of which is shown in FIG. 7. The beginning and end of selected route section 5-3 are displayed in a larger scale in the main screen of the display, which is now divided into two sections. Coordinate points 17 of route section 5-3, which were recorded using a GPS receiver, are emphasized, in the form of small black circles in this case. A portion located at the beginning of section 5-3 where, due to the turning maneuver performed previously, the route being followed does not yet conform with the desired level of accuracy to a straight route which the driver intends to take is shown clearly in the enlarged view, and the driver may use cursor keys 18, 19 to select which of the various coordinate points 17 recorded while starting route 1 was being followed should be used to start section 5-3. Coordinate point 17, which has been selected as the start point of the reference driving track, is indicated in the depiction in FIG. 7 by a circle around it, and by the fact that the reference driving track is shown as a bold line, while parts of starting route 1 adjacent thereto are shown as thin lines. Cursor keys 20, 21 for moving the end point of route section 5-3 are displayed on the opposite edge of the screen, adjacent to the depiction of the end of route section 5-3.

In practical applications, coordinate points 17 of which section 5-3 is composed never lie exactly on a straight line. Even in the case in which a vehicle is steered straight ahead in an ideal manner, the coordinate points that are recorded are randomly offset laterally relative to the direction of travel. Random lateral offsets of this type are undesirable to have in a reference driving track, since they would make it necessary to perform continuous steering corrections when following a planned driving track that is based on a reference driving track of this type. To prevent this from occurring, it is advantageous to reduce lateral offsets of the coordinate points recorded while following starting route 1 by calculating the lateral offset for successively recorded coordinate points 17 relative to the current direction of travel, and to suppress, or at least reduce, random disturbing influences on the lateral offset by using low-pass filters. It is also feasible to straighten selected route section 5-3 as follows: the operator selects individual coordinate points from among coordinate points 17 of the route section, and the computer replaces the polygon plotted between selected coordinate points 17 with a straight line between the selected points, or the computer calculates a regression line through coordinate points 17 of section 5-3 which was selected as the reference driving track, e.g., using the method of least squares. The operator may initiate a straightening of this type, e.g., by actuating a key 22 on screen.

Although a straightening of this type has direct advantages when one of the sections 5-1, 5-2 extending along straight edge of field 2 is selected as the reference driving track, it is problematic in the case of section 5-3, since the left edge of the field on which section 5-3 extends in the opposite direction is itself not straight. If the lateral deviation between the route actually followed and the straightened route is greater than the working width of the vehicle, then using the straightened route instead of route section 5-3 actually followed as the reference driving track would result in parts of the field area being worked twice or not at all. To eliminate this problem, a key 23 may be provided which allows the operator to subdivide section 5-3 into two subsections 24-1, 24-2 (see FIG. 7). The boundary between the two subsections 24-1, 24-2 may be defined purely manually by the driver using cursor keys to select one of the coordinate points 17 at which the subdivision should occur; preferably it may be supported by the computer that calculates coordinate point 25 on section 5-3 at which it has the greatest change in direction (see FIG. 6), and proposes point 26 as the boundary between the two parts.

Sections 24-1, 24-2 obtained from section 5-3 in this manner each extend along a straight portion of the field edge and, advantageously, may therefore be smoothed or replaced with a regression line. The beginning and end of two sections obtained in this manner may be determined exactly once more in the display mode shown in FIG. 7.

In a further simplified variant, before the computer responds to a command from the operator to straighten a selected route section, it compares the lateral deviations that occur in this route section with the working width of the vehicle, and proposes to subdivide the section into several individual subsections to be straightened if the maximum lateral deviation exceeds a specified portion of the working width.

As shown in FIG. 8, two straight reference tracks 26-1, 26-2 are obtained from sections 24-1, 24-2 as the result of the straightening, and a driving track 27 planned based on these reference driving tracks and extending parallel thereto has a bend that corresponds to the course of the left edge of the field.

Figure 9:
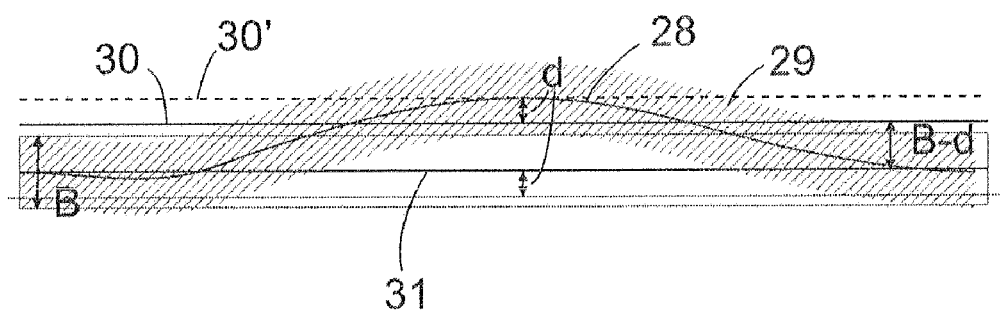
FIG. 9 shows an example of a section of a traversed route, a reference driving track derived from the traversed route, and a further driving track that was planned based on the reference driving track according to the present invention.

FIG. 9 shows how driving tracks to be followed in succession are planned based on a straightened reference driving track. One section of the route actually followed by the vehicle is labeled with reference numeral 28; a shaded region 29 that was worked by the vehicle while route 28 was followed extends along either side of route 28. Although worked region 29 is shown with the same width on either side of route 28, this is not a requirement. If the vehicle uses an asymmetrical working tool, or if the reference point on the vehicle on which route 28 is based is outside of the middle plane of the vehicle, different widths of region 29 on either side of route 28 may result.

A reference driving track obtained by straightening route 28 that was followed is labeled with reference numeral 30. If a track 31 to be followed next by the vehicle should extend parallel to reference driving track 30, then its distance from traveled route 28 should be less than working width B of the vehicle in order to account for the deviations between route 28 and reference driving track 30, and to ensure that no gaps occur when working the field. The maximum deviation by which route 28 deviates from the side of reference driving track 30 that faces away from driving track 31 to be planned is labeled with reference letter d. A track that is parallel to reference driving track 30 is therefore planned as new driving track 31, the distance from reference driving track 30 of which is smaller by amount d than is working width B of the vehicle.

In certain circumstances, deviation d may be greater than working width B, with the result that the distance—which has been reduced by d—between reference driving track 30 and driving track 31 to be planned becomes negative. In a case such as this, track 31 to be followed next is planned on the side of reference driving track 30 facing away from the region yet to be worked, and, adjacent to track 31, tracks to be followed are planned on the side of track 31 facing the region to be worked, at distance B therefrom.

Although, in the above-described procedure, the driving tracks planned based on reference driving track 30 are all separated from each other by distance B, and only the distance between reference driving track 30 and first planned driving track 31 may be less than B, it is possible, as an alternative, to define the reference driving track in such a manner that it is also separated from first planned driving track 31 by distance B. It is sufficient to displace the reference driving track obtained by straightening traveled route 28 from the side facing away from the driving tracks to be planned by distance d, thereby resulting in reference driving track labeled with reference numeral 30' in FIG. 9.

Various methods are feasible for use to estimate the change in direction on route 28 that is followed. According to one possibility, the location information as well as a steering angle are monitored on board the vehicle, and are transmitted to the computer; the computer considers a limit value of the change in direction to have been exceeded if the angle of the steering wheel exceeds a specified limit value along a significant distance of travel of, e.g., several meters.

As an alternative, the computer may also obtain information about the change in direction of route 28 from the transmitted location information itself. If the vehicle transmits location information such a coordinate points 33-1, 33-2, 33-3 shown in bold in FIG. 10 to the computer, e.g., every time after a specified distance has been traversed, then angle a formed at middle coordinate point 33-2 is a useful measure of the change in direction at this point, and a maximum permissible deviation of 180° may be specified for angle a as the limit value for the change in direction. A possible alternative measure of the change in direction is the radius of a circular arc that connects points 33-1, 33-2, 33-3. The midpoint of this circular arc is the intersection of two mean perpendiculars on paths (33-1, 33-2) and (33-2, 33-3). The smaller this radius is, the greater is the change in direction.

Figure 10:
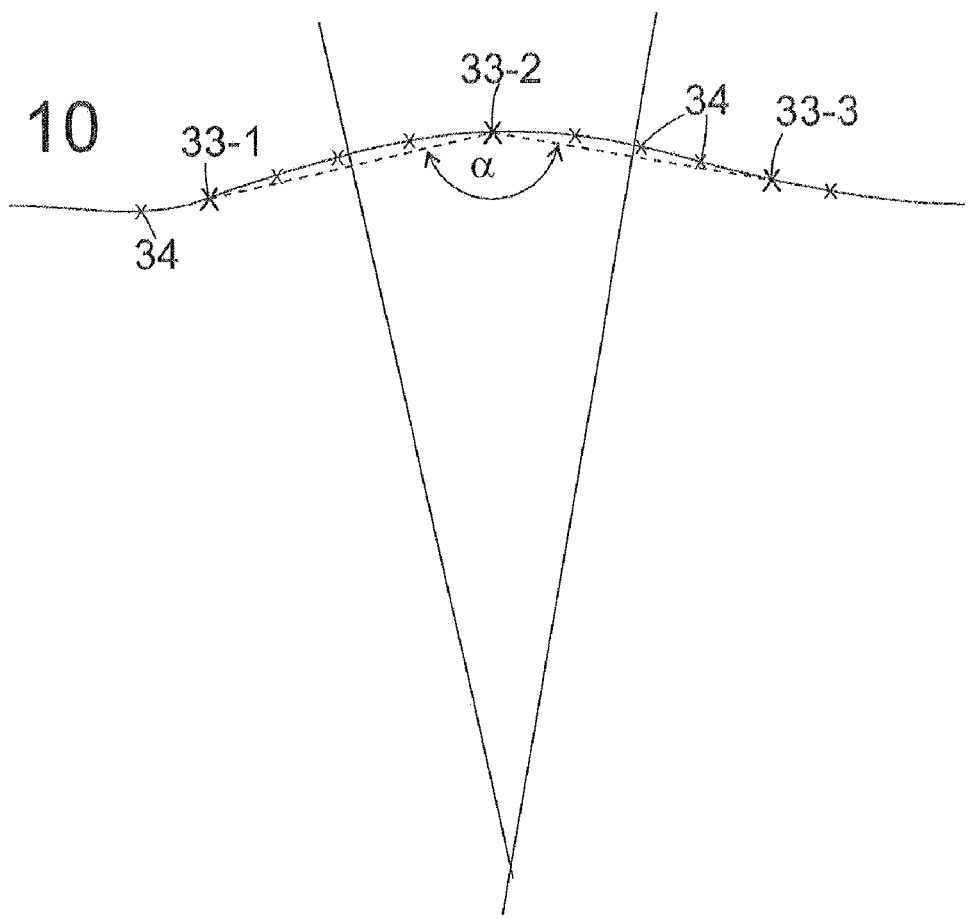
FIG. 10 shows examples of the determination of the change in direction of the route being followed according to the present invention.

It may also be advantageous to use more than three coordinate points to estimate the change in direction. If additional coordinate points 34 are registered between points 33-1, 33-2, 33-3, it is possible to also register extreme steering maneuvers over a short distance, which remain undetected when a rough grid of coordinate points is used. Since, as the density of coordinate points increases, the angle formed by three consecutive coordinate points converge to 180°, and the calculation of the radius of a circular arc that connects the three points becomes less and less reliable, it may be advantageous to determine the angle between paths that are not directly adjacent to one another, e.g., between those that connected points 33-1, 33-2 to a particular adjacent point 34, as shown in FIG. 10.

It will be understood that each of the elements described above, or two or more together, may also find a useful application in other types of constructions differing from the types described above.

While the invention has been illustrated and described as embodied in a method for generating reference driving tracks for agricultural working machines, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method for generating one or more reference driving tracks for use in automatic route planning of an agricultural working vehicle, comprising the steps of
    driving along a starting route of an agricultural field to be worked;
    recording the starting route in a data processing device;
    selecting at least one section of the recorded starting route as a reference driving track;
    investigating the starting route along its entire length for changes in direction; and
    in the selecting at least one section, selecting a section as the reference driving track only if a change in direction that falls below a limit value is not found anywhere along an entire length of the section.

2. The method as defined in claim 1, wherein said selecting at least one section includes preselecting one or more reference driving tracks, and offering the preselected reference driving tracks to an operator for him to make his final selection.

3. The method as defined in claim 2, further comprising displaying the preselected reference driving tracks to the operator on a screen.

4. The method as defined in claim 2, further comprising offering to the operator an option of shortening or lengthening the preselected reference driving track.

5. The method as defined in claim 1, further comprising in said selecting at least one section, selecting several sections of the recorded starting route and evaluating them in terms of quality based on at least one criterium, and selecting the section having a highest quality as the reference driving track.

6. The method as defined in claim 1, further comprising in said selecting at least one section, selecting out of several overlapping sections that contain no changes in direction that exceeds the limit value anywhere along the entire length, only a longest one as the reference driving track.

7. The method as defined in claim 1, further comprising registering a speed of the working machine as it follows the starting route, and in said selection at least one section, selecting only those sections of the starting route as the reference driving track along which a minimum speed was not fallen below.

8. The method as defined in claim 1, further comprising in said selecting at least one section, discarding out of several sections that contain no changes in direction that exceed the limit value anywhere along the entire length, at least one which includes a greatest change in direction.

9. The method as defined in claim 1, further comprising in said selecting at least one section, determining out of several sections that contain no changes in direction that exceeds the limit value anywhere along the entire length a preferred direction, and discarding at least one of the sections having a direction that deviates the most from the preferred direction.

10. The method as defined in claim 1, further comprising in said selecting at least one section, discarding out of several sections that contain no changes in direction that exceeds the limit value anywhere along the entire length, every section having a length that falls below a specific minimal length.

11. The method as defined in claim 1, further comprising excluding sections that are driven along in a reverse direction from the recorded starting route.

12. The method as defined in claim 1, further comprising smoothing the section of the recorded starting route which was selected as a reference driving track.

13. The method as defined in claim 12, wherein said smoothing includes smoothing carried out upon initiation by an operator.

14. The method as defined in claim 12, further comprising determining a lateral offset between the selected section before smoothing and the reference driving track, and planning a track parallel to the reference driving track at a distance from the reference driving track which corresponds to a working width of the vehicle, corrected by the lateral offset.

15. The method as defined in claim 1, further comprising providing the starting route which covers a portion of the agricultural field to be worked, and using the selected reference driving track to plan a route on a part of the field not covered by the starting route.

16. The method as defined in claim 1, further comprising using as a measure of a change in direction at least one variable selected from the group consisting of an angle formed by three consecutive points on the route, a local radius of curvature of the route, and the steering angle of the vehicle.

* * * * *